(12) United States Patent
Chien et al.

(10) Patent No.: US 8,159,468 B2
(45) Date of Patent: Apr. 17, 2012

(54) TOUCH SUBSTRATE OF EMBEDDED TOUCH DISPLAY PANEL AND MANUFACTURING METHOD THEREOF

(75) Inventors: Yu-Feng Chien, Hsin-Chu (TW);
Zeng-De Chen, Hsin-Chu (TW);
Wei-Chen Tsai, Hsin-Chu (TW);
Mei-Sheng Ma, Hsin-Chu (TW);
Shih-Yu Wang, Hsin-Chu (TW);
Tun-Chun Yang, Hsin-Chu (TW);
Seok-Lyul Lee, Hsin-Chu (TW);
Wei-Ming Huang, Hsin-Chu (TW)

(73) Assignee: Au Optronics Corp., Hsin-Chu (TW)

( * ) Notice: Subject to any disclaimer, the term of this patent is extended or adjusted under 35 U.S.C. 154(b) by 536 days.

(21) Appl. No.: 12/435,698

(22) Filed: May 5, 2009

(65) Prior Publication Data
US 2010/0026658 A1 Feb. 4, 2010

(30) Foreign Application Priority Data
Aug. 4, 2008 (TW) .............................. 97129561 A

(51) Int. Cl.
*G06F 3/041* (2006.01)
(52) U.S. Cl. ........ 345/173; 345/104; 345/174; 349/139; 349/158
(58) Field of Classification Search ............... 345/30, 345/38, 50–71, 104, 173–178; 349/12, 139, 349/158, 160, 162, 187
See application file for complete search history.

(56) References Cited

U.S. PATENT DOCUMENTS

| 6,215,538 | B1 * | 4/2001 | Narutaki et al. ............. 349/106 |
| 7,034,808 | B2 | 4/2006 | Sakata et al. |
| 7,230,666 | B2 * | 6/2007 | Nishiyama et al. ........... 349/141 |
| 7,538,839 | B2 * | 5/2009 | Maeda et al. ................. 349/114 |
| 2008/0180615 | A1 * | 7/2008 | Haruyama ..................... 349/114 |

FOREIGN PATENT DOCUMENTS
JP 11250764 9/1999
* cited by examiner

*Primary Examiner* — Alexander Eisen
*Assistant Examiner* — Christopher E Leiby
(74) *Attorney, Agent, or Firm* — Rabin & Berdo, PC

(57) ABSTRACT

An embedded touch display panel including a first substrate and a second substrate is provided. The first substrate having a displaying region and a sensing region includes a stack structure, a first conductive layer and a first alignment layer. The stack structure disposed on the first substrate within the sensing region includes a protruding structure and a first rough structure disposed on the protruding structure. The first conductive layer conformally disposed on the stack structure has a first rough surface. The first rough surface is exposed from the first alignment layer that covers the first conductive layer. The second substrate includes a second conductive layer and a second alignment layer. The second conductive layer whose position corresponds to the sensing region is disposed on the second structure. A portion of the second conductive layer corresponding to the first rough surface is exposed from the second alignment layer covering thereon.

23 Claims, 7 Drawing Sheets

TOUCH SUBSTRATE OF EMBEDDED TOUCH DISPLAY PANEL AND MANUFACTURING METHOD THEREOF

This application claims the benefit of Taiwan application Serial No. 97129561, filed Aug. 4, 2008, the subject matter of which is incorporated herein by reference.

BACKGROUND OF THE INVENTION

1. Field of the Invention

The invention relates in general to a touch substrate of embedded touch display panel and manufacturing method thereof, and more particularly to a press type touch substrate of embedded touch display panel and manufacturing method thereof.

2. Description of the Related Art

Along with the advance in thin display technology, various thin display devices, having the features of small size, light weight, low radiation and low power consumption, have become a best buy to consumers when selecting a display or TV. Among various display panels of thin display device, liquid crystal display panel has gradually become more and more popular along with the improvement in the yield rate and the display quality. On the other hand, as the touch control human machine interface technology is now provided, manufacturers are dedicated to the development of touch display panel which integrates touch control function and display function.

Of various touch display panels, the embedded touch display panel, which integrates the touch panel and the display panel into a single touch display panel, effectively reduces the overall thickness of the touch panel and has become a focus of research and development in the field of touch display panel. Referring to FIG. 1, a cross-sectional view of a conventional embedded touch display panel is shown. The embedded touch display panel 100 includes a top substrate 110, a bottom substrate 170 and a liquid crystal layer 150. The liquid crystal layer 150 is disposed between the top substrate 110 and the bottom substrate 170. In generally speaking, the embedded touch display panel 100 can be divided into a sensing region R1 and a displaying region R2. The displaying region R2 has a pixel structure (not illustrated) that is commonly seen in a liquid crystal display panel. For example, the displaying region R2 includes the elements such as metal layer, semi-conductor layer, passivation layer and pixel electrode. The top substrate 110 within the sensing region R1 has a first conductive layer 113 and a first alignment layer 115, which are sequentially disposed on the base 111 of the top substrate 110. The bottom substrate 170 within the sensing region R1 has a second conductive layer 173 and a second alignment layer 175, which are sequentially disposed on the base 171 of the bottom substrate 170. The first alignment layer 115 and the second alignment layer 175 are respectively disposed on the surface of the top substrate 110 and the surface of the bottom substrate 170 that are adjacent to the liquid crystal layer 150 for fixing the direction of liquid crystal molecules in the liquid crystal layer 150. Besides, the embedded touch display panel 100 further includes a sensing protrusion 130 disposed on the top substrate 110 or the bottom substrate 170 within the sensing region R1. Here, the sensing protrusion 130 is disposed on the surface of the top substrate 110 facing the bottom substrate 170.

When a portion of the embedded touch display panel 100 adjacent to the sensing protrusion 130 is pressed, the distance between the top substrate 110 and the bottom substrate 170 will be reduced, such that the sensing protrusion 130 positioned on the top substrate 110 contacts the bottom substrate 170. As a result, the first conductive layer 113 can electrically contact the second conductive layer 173. When the first conductive layer 113 electrically contacts the second conductive layer 173, the embedded touch display panel 100 outputs a touch signal according to the position at which the first conductive layer 113 contacts the second conductive layer 173. In practical application, the first alignment layer 115 that covers the first conductive layer 113 and the second alignment layer 175 that covers the second conductive layer 173 may easily impede electrical contact between the first conductive layer 113 and the second conductive layer 173. As the touch signal outputted by the embedded touch display panel 100 is poor, the sensibility of touch control is reduced and the operatability and product quality are deteriorated.

SUMMARY OF THE INVENTION

The invention is directed to a touch substrate of an embedded touch display panel and a manufacturing method thereof. A portion of conductive layer is exposed from an alignment layer, such that when the touch display panel is pressed, the conductive layer of the top substrate electrically contacts the conductive layer of the bottom substrate easily. Thus, the operatability of the touch display panel is improved and product quality is enhanced.

According to a first aspect of the present invention, an embedded touch display panel including a first substrate, a second substrate and a liquid crystal layer is provided. The first substrate having a displaying region and a sensing region includes a stack structure, a first conductive layer and a first alignment layer. The stack structure disposed on the first substrate within the sensing region includes a protruding structure and a first rough structure. The first rough structure is disposed on the protruding structure. The first conductive layer disposed on the first substrate within the sensing region is conformally disposed on the stack structure. The first conductive layer has a first rough surface. The first rough surface of the first conductive layer is exposed from the first alignment layer that covers the first conductive layer. The second substrate correspondingly disposed on one side of the first substrate includes a second conductive layer and a second alignment layer. The second conductive layer whose position corresponds to the sensing region is disposed on the second structure. A portion of the second conductive layer corresponding to the first rough surface of the first conductive layer is exposed from the second alignment layer that covers the second conductive layer. The liquid crystal layer is disposed between the first substrate and the second substrate.

According to a second aspect of the present invention, a touch substrate applicable to an embedded touch display panel is provided. The touch substrate includes a base, a rough structure, a conductive layer and an alignment layer. The base has a displaying region and a sensing region. The rough structure is disposed on the base within the sensing region. The conductive layer having a rough surface is conformally disposed on the rough structure. A portion of the rough surface is exposed from the alignment layer which is disposed on the conductive layer and covers the base and the conductive layer.

According to a third aspect of the present invention, a method of manufacturing touch substrate applicable to an embedded touch display panel is provided. The manufacturing method includes the following steps. Firstly, a base having a displaying region and a sensing region is provided. Next, a rough structure is formed on the base within the sensing region. Then, a conductive layer is conformally formed on the rough structure, wherein the conductive layer disposed on the rough structure has a rough surface. Moreover, an alignment layer is formed on the conductive layer by the rubbing technology, wherein the rough structure of the conductive layer is exposed from the alignment layer.

The invention will become apparent from the following detailed description of the preferred but non-limiting embodiments. The following description is made with reference to the accompanying drawings.

DETAILED DESCRIPTION OF THE INVENTION

Figure 1:
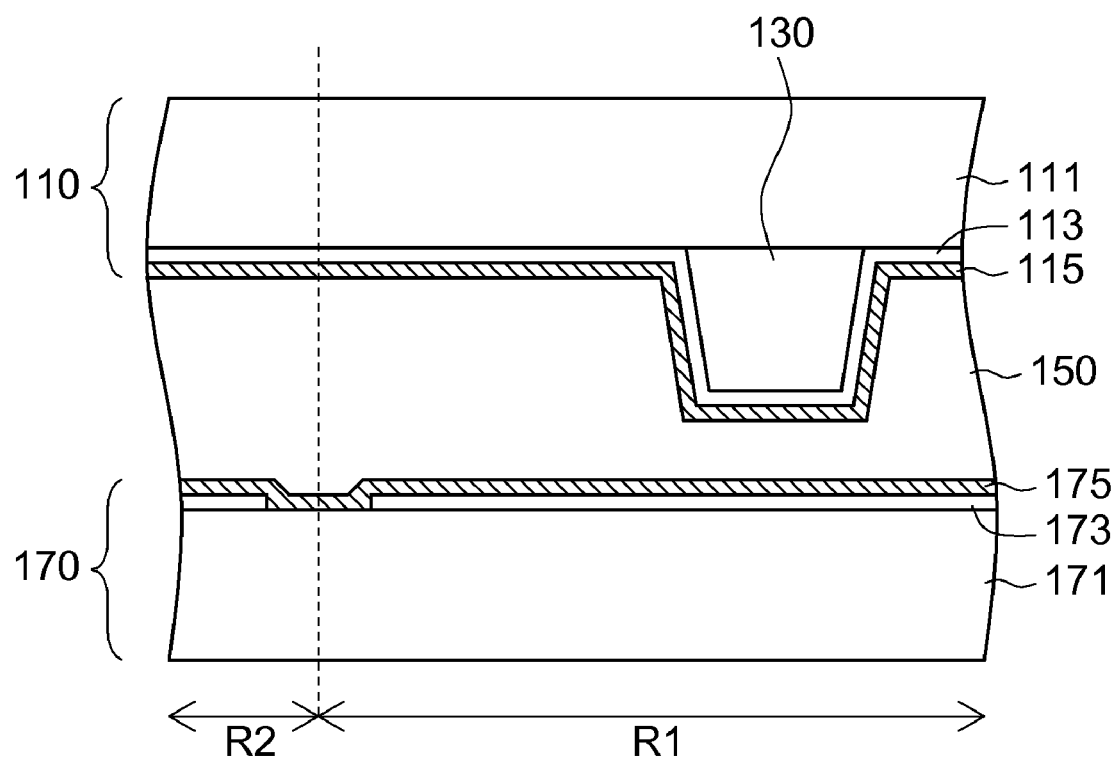
FIG. 1 shows a cross-sectional view of a conventional embedded touch display panel.

On the part of the touch substrate of an embedded touch display panel disclosed in a first and a second embodiment of the invention, a rough structure is formed by different material layers under the conductive layer within the sensing region, such that the alignment layer within the sensing region only partly covers the base. Thus, when the touch display panel is pressed, the conductive layer of the top substrate can electrically contact the conductive layer of the bottom substrate, hence avoiding the problem of deterioration in the operatability of the touch display panel which arises when electrical contact between two conductive layers is poor. Moreover, the rough structure can be formed by existing manufacturing process of the mask of the touch substrate, such that the manufacturing method according to the embodiment of the invention is compatible with the manufacturing process of conventional embedded touch display panel. The rough structure can also be formed by way of forming the protruding structure on a base without changing the pattern of the mask of each material layer in the original manufacturing process. A first embodiment and a second embodiment are disclosed below for further elaborating the invention. However, these embodiments are for elaboration only not for limiting the scope of protection of the invention. Besides, secondary elements are omitted in the drawings of the embodiments so as to highlight the technical features of the invention.

First Embodiment

Figure 2:
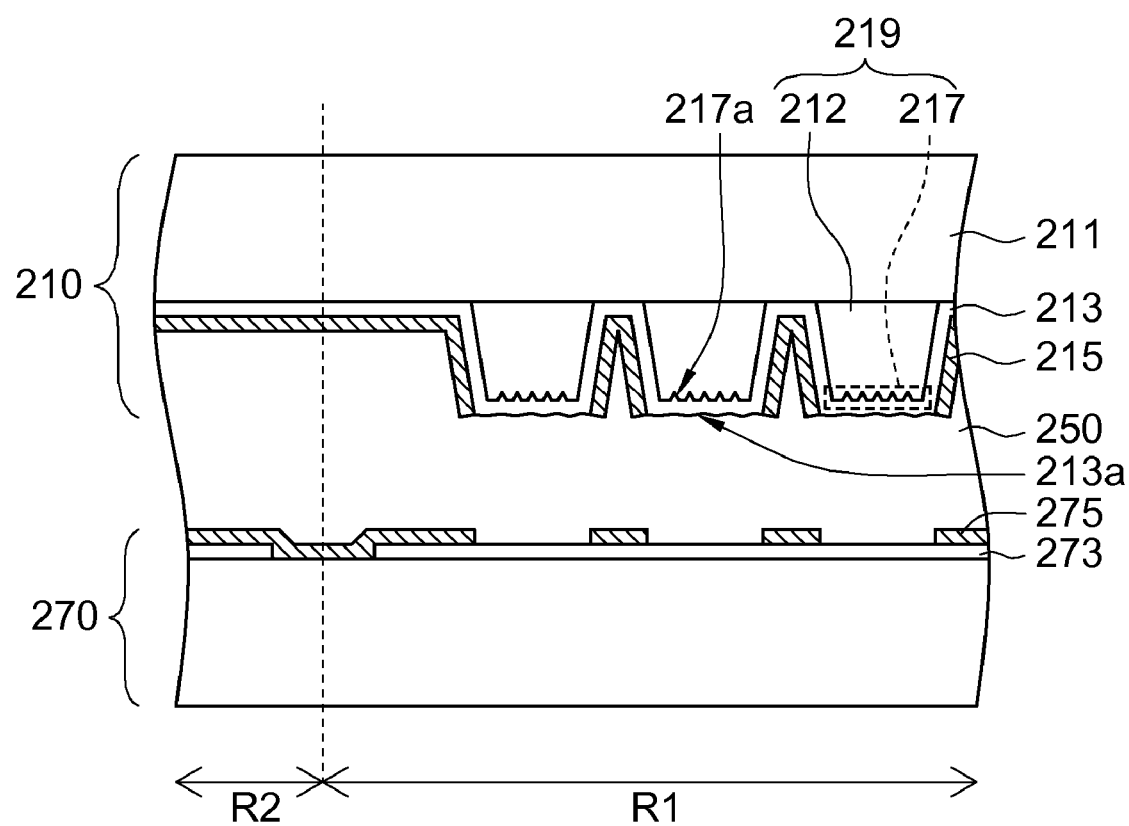
FIG. 2 shows a cross-sectional view of an embedded touch display panel according to a first embodiment of the invention.

Referring to FIG. 2, a cross-sectional view of an embedded touch display panel according to a first embodiment of the invention is shown. The embedded touch display panel 200 includes a first substrate 210, a second substrate 270 and a liquid crystal layer 250. In the present embodiment of the invention, the first substrate 210 and the second substrate 270 are respectively exemplified by a top substrate and a bottom substrate of the embedded display panel 200. The top substrate can be a color filter substrate for example, and the bottom substrate can be a transistor array substrate for example. Besides, anyone who is skilled in the technology of the invention will understand that the top substrate can be a counter substrate, and the bottom substrate can be a color filter on array substrate. The first substrate 210 having a displaying region R2 and a sensing region R1 includes a stack structure 219, a first conductive layer 213 and a first alignment layer 215. In the present embodiment of the invention, the stack structure 219 includes a protruding structure 212 and a first rough structure 217. The stack structure 219 is disposed on the first substrate 210 within the sensing region R1. The first rough structure 217 is disposed on the protruding structure 212. The first conductive layer 213 disposed on the first substrate 210 within the sensing region R1 is conformally disposed on the stack structure 219, such that the first conductive layer 213 has a first rough surface 213a. The first rough surface 213a of the first conductive layer 213 is exposed from the first alignment layer 215 that covers the first conductive layer 213. Moreover, the second substrate 270 correspondingly disposed on one side of the first substrate 210 includes a second conductive layer 273 and a second alignment layer 275. In the present embodiment of the invention, the second substrate 270 is disposed under the first substrate 210. The second conductive layer 273 whose position corresponds to the sensing region R1 is disposed on the second substrate 270. A portion of the second conductive layer 273 corresponding to the first rough surface 213a is exposed from the second alignment layer 275 that covers the second conductive layer 273. Besides, the liquid crystal layer 250 is disposed between the first substrate 210 and the second substrate 270.

The touch substrate of the invention may include a first substrate 210 or a second substrate 270. The first substrate 210 of the embedded touch display panel 200 is exemplified below. The protruding structure 212 of the first substrate 210 having a sensing protrusion is disposed on a base 211. Moreover, the first rough structure 217 has many slots 217a. When the first conductive layer 213 is conformally disposed on the stack structure 219 constituted by the protruding structure 212 and the first rough structure 217, the first conductive layer 213 forms a first rough surface 213a in the shape of the slots 217a. In the present embodiment of the invention, the protruding structure 212 and the first rough structure 217 preferably are made from the same material.

Figure 3A:
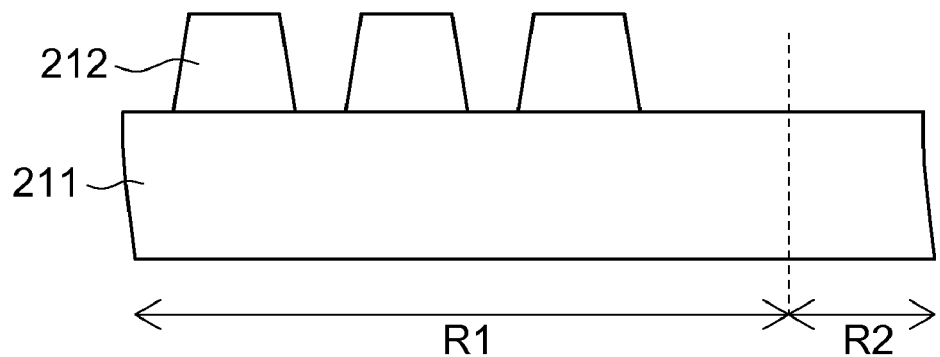
FIGS. 3A~3D respectively show the steps of a method of manufacturing a touch substrate according to a first embodiment of the invention.
Figure 3B:
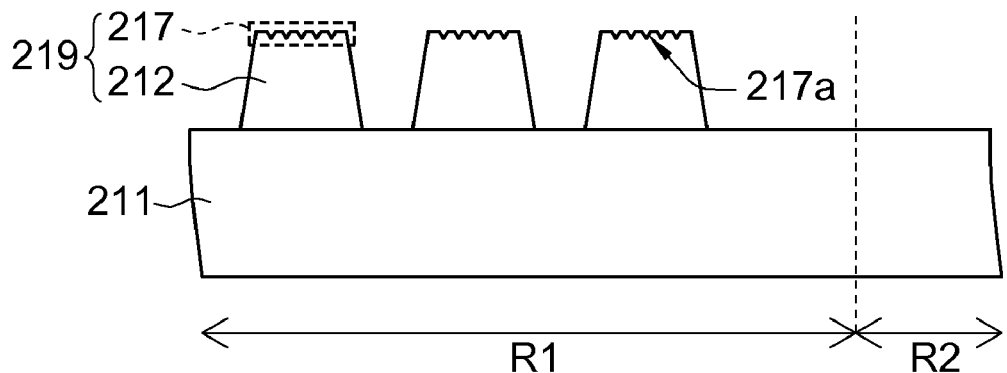

The method of manufacturing the first substrate 210 is disclosed below with the accompanying drawings of FIG. 3A~3D. Referring to FIG. 3A~3D, the steps of a method of manufacturing a touch substrate according to a first embodiment of the invention are shown. The method of manufacturing the first substrate 210 (the touch substrate) of the present embodiment of the invention includes the following steps. Firstly, a base 211 having a sensing region R1 and a displaying region R2 is provided. Next, a first rough structure 217 is formed on the base 211 within the sensing region R1 as indicated in FIG. 3A and FIG. 3B. In the step of forming the first rough structure 217, the protruding structure 212 and the first rough structure 217 are made from the same material, such that the stack structure 219 can be formed by the single material layer disposed on the base 211. For example, firstly, a protruding structure 212 is formed on the base 211 within the sensing region R1. Then, in the step of forming the first rough structure 217, the mask having many slits or the mask having at least two different light transmittances are used to perform exposure and etching to the top surface of the protruding structure 212 so as to form many slots 217a on the top surface of the protruding structure 21 to form a rough surface like the first rough structure 217 of FIG. 3B.

Figure 3C:
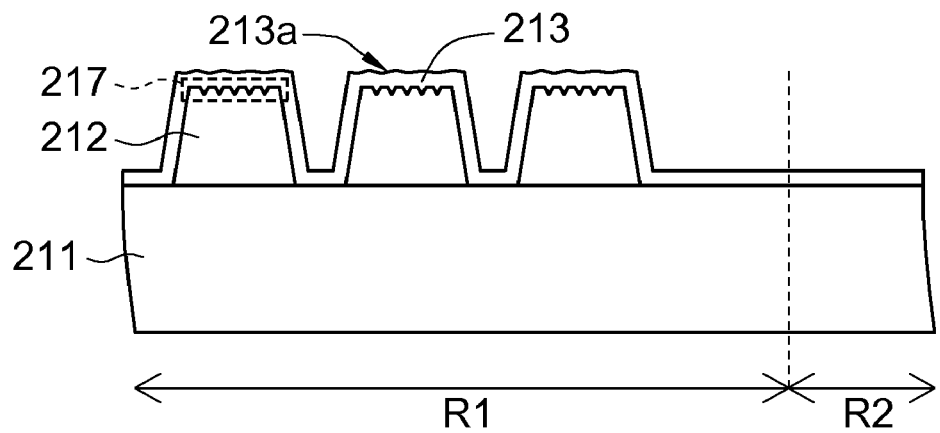

Then, the manufacturing method of the present embodiment of the invention proceeds to the step of conformally forming a first conductive layer 213 on the first rough structure 217. The first conductive layer 213 formed on the first rough structure 217 has a first rough surface 213a as indicated in FIG. 3C. In practical application, the first conductive layer 213 substantially covers the base 211, the protruding structure 212 and the first rough structure 217 within the sensing region R1.

Figure 3D:
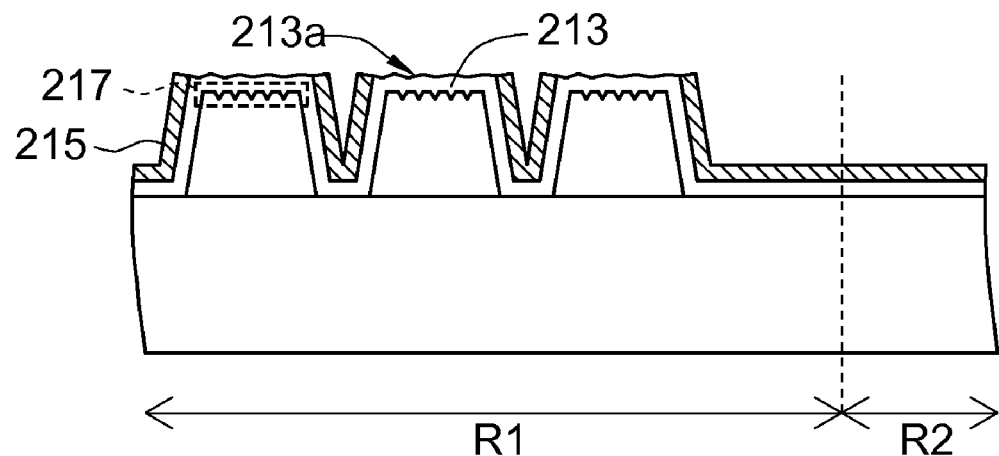

After the first conductive layer 213 is formed, the manufacturing method of the present embodiment of the invention proceeds to the step of forming the first alignment layer 215. The first alignment layer 215 can be formed by way of conventional rubbing technology. For example, the first alignment layer 215 is formed on the first conductive layer 213 as indicated in FIG. 3D. In the present embodiment of the invention, the direction of rubbing the first alignment layer 215 is substantially perpendicular to the direction of exposing and etching the slots 217a as disclosed in the above steps. Thus, there is no remnant of the first alignment layer 215 left on the first rough surface 213a or there is only a portion of the first alignment layer 215 left on the first rough surface 213a. FIG. 3D shows no remnant of the first alignment layer 215 is left on the first rough surface 213a. That is, the first rough surface 213a of the first conductive layer 213 is exposed from the first alignment layer 215, such that the first alignment layer 215 will not impede electrical contact between the first conductive layer 213 and the second conductive layer 273, hence improving the operatability of the embedded touch display panel 200.

Figure 4:
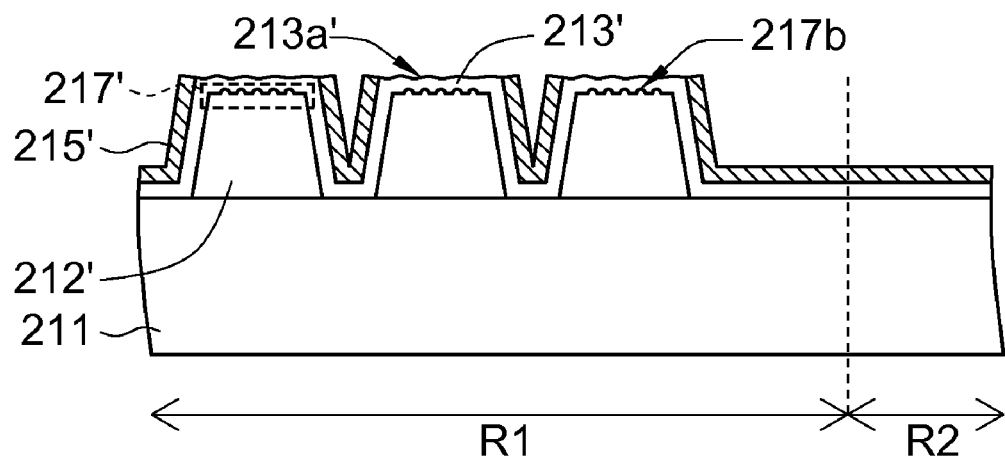
FIG. 4 shows a cross-sectional view of another touch substrate according to a first embodiment of the invention.

Referring to FIG. 4, a cross-sectional view of another touch substrate according to a first embodiment of the invention is shown. In the method of manufacturing the touch substrate 210', the first rough structure 217' is formed by way of forming many protrusions 217b on the top surface of the protruding structure 212'. Likewise, the first conductive layer 213' formed on the first rough structure 217' can also have a rough surface 213a'. Thus, in the curse of rubbing the first alignment layer 215, there is no remnant or only a portion of the first alignment layer 215' left on the first rough surface 213a'. FIG. 4 shows there is no remnant of the first alignment layer 215' is left on the first rough surface 213a'.

Figure 5:
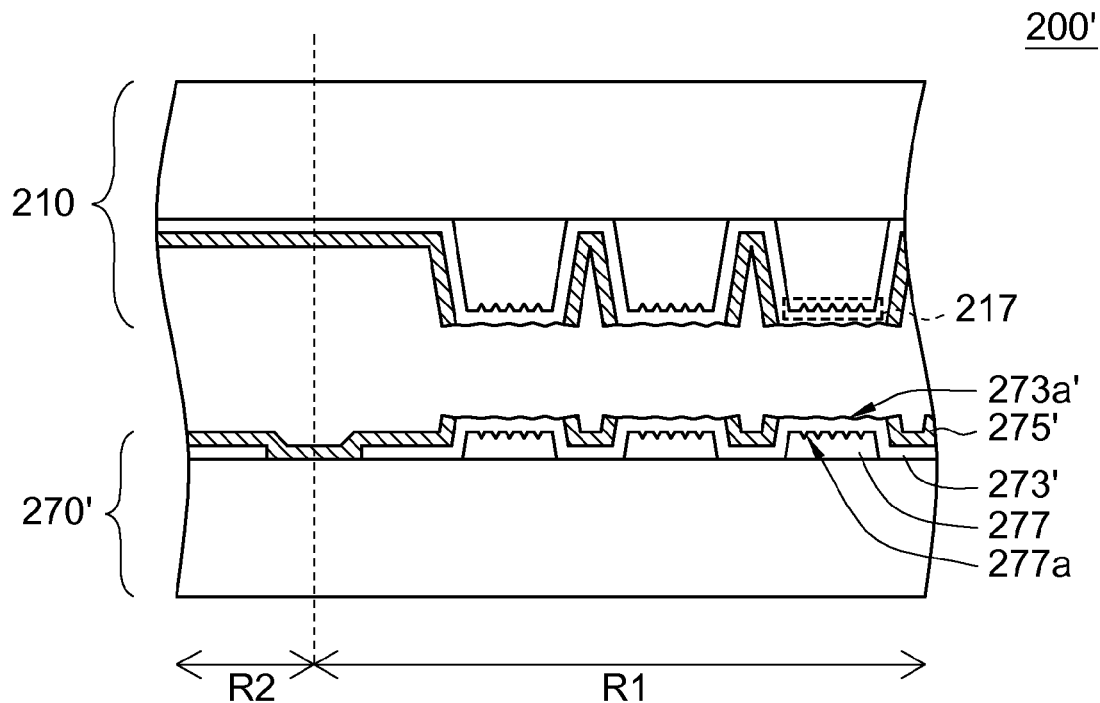
FIG. 5 shows a cross-sectional view of another embedded touch display panel according to a first embodiment of the invention.

In the present embodiment of the invention, the second substrate 270 may further include a second rough structure. Referring to FIG. 5, a cross-sectional view of another embedded touch display panel according to a first embodiment of the invention is shown. On the part of the embedded touch display panel 200', a portion of the second conductive layer 273' is exposed from the second alignment layer 275 of the second substrate 270', and the exposed portion of the second conductive layer 273' has a second rough surface 273a'. The second substrate 270' further includes a second rough structure 277 disposed on one side of the second conductive layer 273' corresponding to the first substrate 210. The second rough structure 277, for example, has many slots 277a, such that the second conductive layer 273' that covers the second rough structure 277 has a second rough surface 273a'. In another embodiment, the second rough structure 277 can also have many protrusions or other structures perpendicular to the direction rubbing the second alignment layer 275', such that the second conductive layer 273' has the second rough surface 273a'. The second rough structure 277 of FIG. 5, for example, is formed by the same method of forming the first rough structure 217, and is not repeated here.

Figure 6:
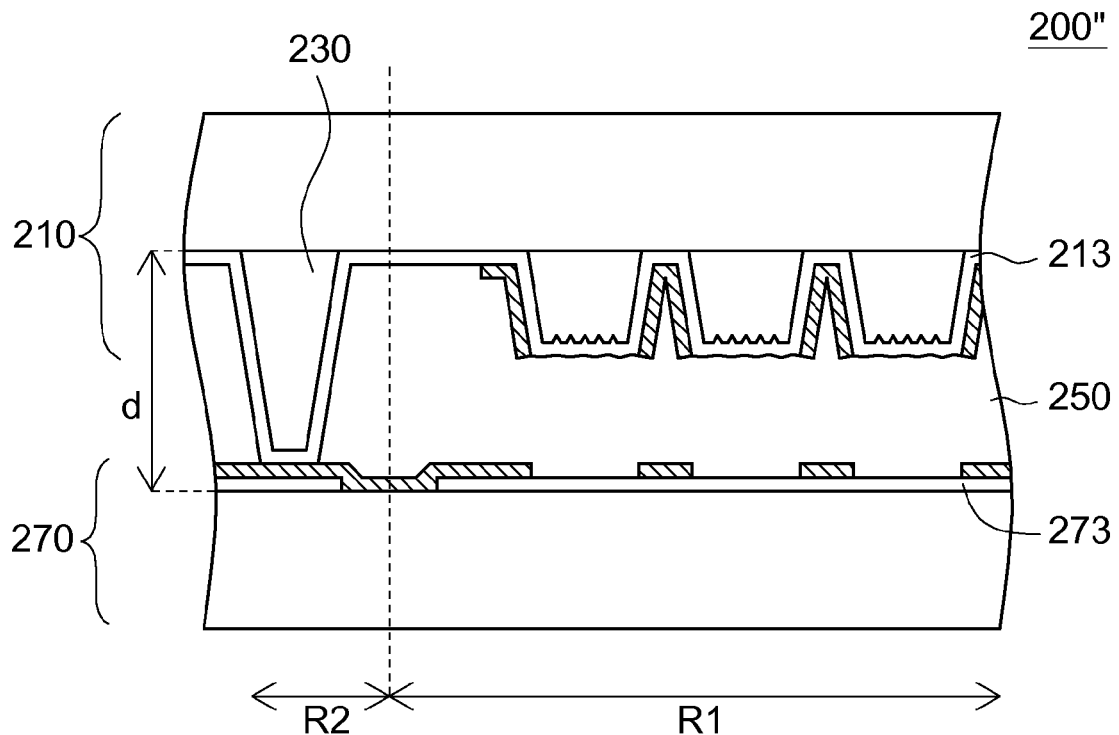
FIG. 6 shows a cross-sectional view of an embedded touch display panel having a spacer according to a first embodiment of the invention.

Referring to FIG. 6, a cross-sectional view of an embedded touch display panel having a spacer according to a first embodiment of the invention is shown. The embedded touch display panel 200" further includes a spacer 230 in addition to the first substrate 210, the second substrate 270 and the liquid crystal layer 250. The spacer 230 is disposed between the first substrate 210 and the second substrate 270 such that the first substrate and the second substrate are separated by a distance d. In the present embodiment of the invention, the spacer 230 is a supporting protrusion for example. Preferably, one end of the spacer 230 contacts the second substrate 270, and another end contacts the first substrate 210, such that when the embedded touch display panel 200" is not pressed, the first conductive layer 213 does not contact the second conductive layer 273.

As indicated in FIG. 2, on the part of the embedded touch display panel 200 according to a first embodiment of the invention, a stack structure 219 is disposed on the base 211 of the first substrate 210. The first rough structure 217 of the stack structure 219 has many slots 217a, many protrusions 217b (as indicated in FIG. 4) or other structures perpendicular to the direction of rubbing the first alignment layer 215, such that the first conductive layer 213 that covers the first rough structure 217 has a first rough surface 213a. When rubbing the first alignment layer 215, there is no remnant or only a portion of the first alignment layer 215 left on the first rough surface 213a. When the embedded touch display panel 200 is pressed, electrical contact between the first conductive layer 213 and the second conductive layer 273 is excellent, hence effectively avoiding the alignment layer impeding electrical contact of the conductive layers in a conventional touch control display panel. Thus, the operatability of the touch display panel 200 is improved and product quality is enhanced.

Second Embodiment

The embedded touch display panel of the second embodiment of the invention differs with the embedded touch display panel of the first embodiment in the design of the rough structure of the second substrate, and other similarities are not repeated.

Figure 7A:
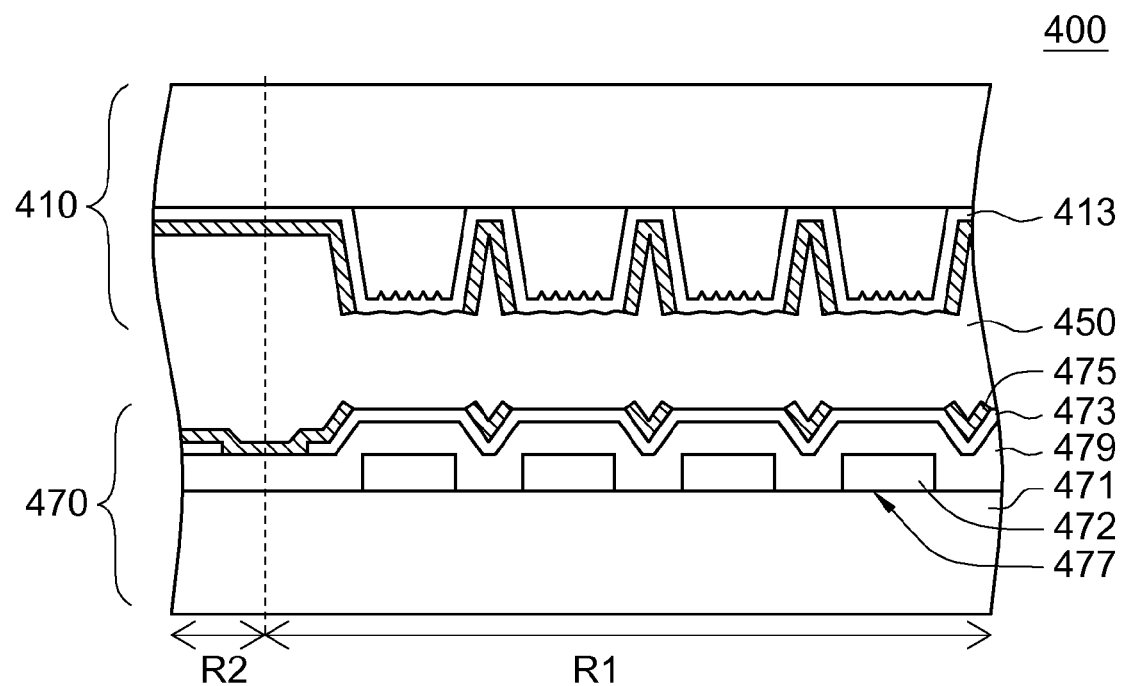
FIG. 7A shows a cross-sectional view of an embedded touch display panel according to a second embodiment of the invention.

Referring to FIG. 7A, a cross-sectional view of an embedded touch display panel according to a second embodiment of the invention is shown. The embedded touch display panel 400 includes a first substrate 410, a second substrate 470 and a liquid crystal layer 450. The second substrate 470 includes a base 471, a second rough structure 477, a second conductive layer 473 and a second alignment layer 475. The base 471 has a displaying region R2 and a sensing region R1, wherein the second rough structure 477 is disposed on the base 471 within the sensing region R1. The second conductive layer 473 is conformally disposed on the second rough structure 477. Overall speaking, the second conductive layer 473 within the sensing region R1 has a non-even rough surface. The second alignment layer 475 disposed on the second conductive layer 473 covers the base 471 and the second conductive layer 473. A portion of the rough surface of the second conductive layer 473 is exposed from the second alignment layer 475.

Furthermore, the second rough structure 477 of the present embodiment of the invention can be directly formed on the existing material layer. Examples of the existing material layer include the metal layer and the semiconductor layer. For example, the second rough structure 477 includes a patterned metal layer 472 positioned within the sensing region R1 and formed via the patterned metal layer. The patterned metal layer 472 has a first pattern, such that the second conductive layer 473 covering the second rough structure 477 has a rough surface. Moreover, the second substrate 470 further includes a passivation layer 479 disposed between the second conductive layer 473 and the patterned metal layer 472 and covering the base 471 and the patterned metal layer 472.

Figure 7B:
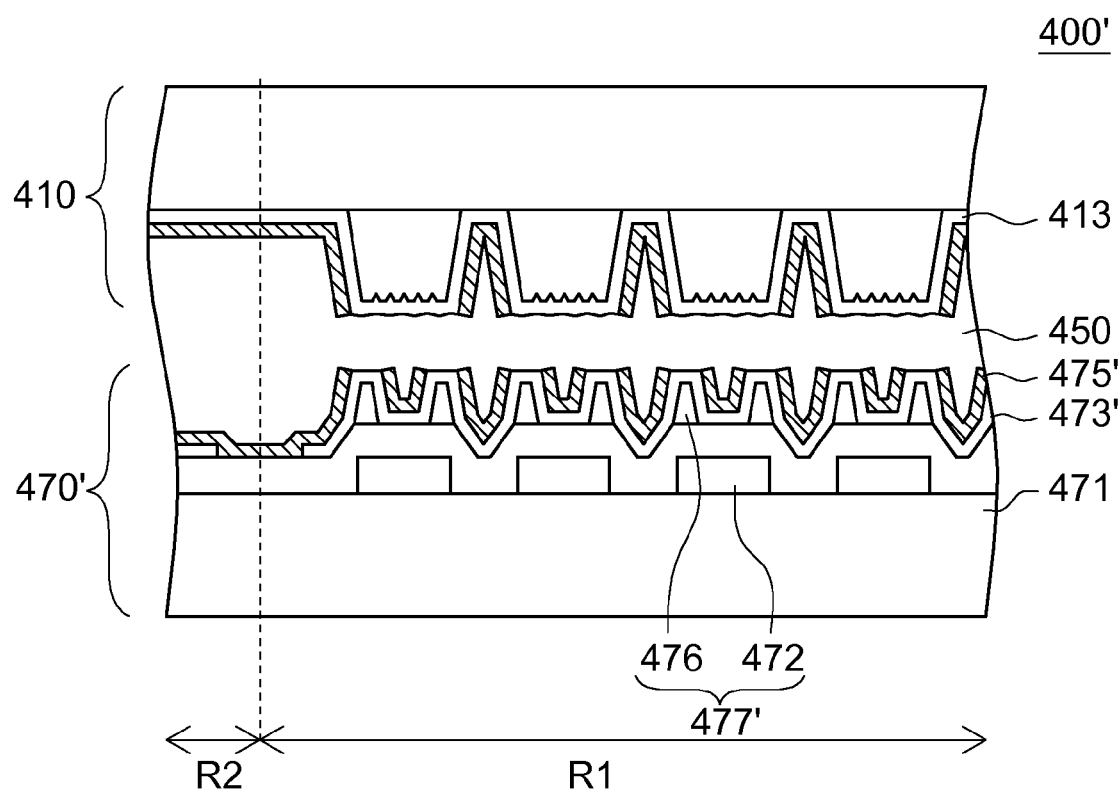
FIG. 7B shows a cross-sectional view of another embedded touch display panel according to a second embodiment of the invention.
Figure 7C:
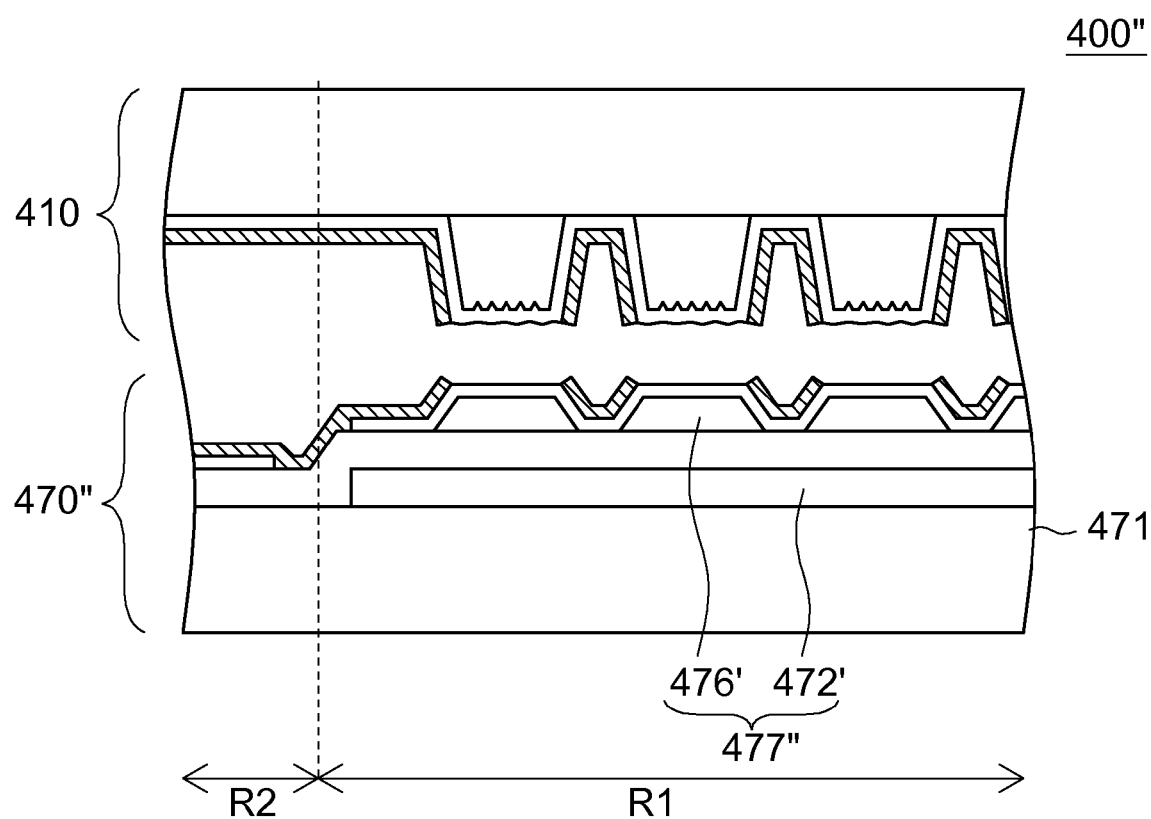
FIG. 7C shows a cross-sectional view of yet another embedded touch display panel according to a second embodiment of the invention.

The second rough structure 477 includes a patterned semiconductor layer in addition to a patterned metal layer 472. Referring to FIG. 7B, a cross-sectional view of another embedded touch display panel according to a second embodiment of the invention is shown. The embedded touch display panel 400' includes a first substrate 410, a second substrate 470' and a liquid crystal layer 450. The second rough structure 477' of the second substrate 470' includes t patterned metal layer 472 and a patterned semiconductor layer 476 disposed between the patterned metal layer 472 and the second conductive layer 473'. The patterned semiconductor layer 476, for example, is positioned within the sensing region R1 and formed via the patterned semiconductor layer. The patterned semiconductor layer 476 has a second pattern different from the first pattern. Referring to FIG. 7C, a cross-sectional view of yet another embedded touch display panel according to a second embodiment of the invention is shown. The second rough structure 477'' of the second substrate 470'', for example, is formed by stacking the non-patterned metal layer 472' and the patterned semiconductor layer 476'. The metal layer 472' substantially covers the base 471 within the sensing region R1.

Let FIG. 7B be taken for example. On the part of the embedded touch display panel 400' according to a second embodiment of the invention, the second rough structure 477' is formed by the existing material layer of the touch substrate, such that when rubbing the second alignment layer 475' on the second conductive layer 473', the second alignment layer 475' does not cover or only covers a part of the second rough structure 477' to expose a portion of the second conductive layer 473', such that electrical contact between the second conductive layer 473' and the first conductive layer 413 is excellent, and the operatability of the embedded touch display panel is improved.

According to the touch substrate of embedded touch display panel and manufacturing method thereof disclosed in the first and the second embodiment of the invention, a first rough structure is formed under the first conductive layer, and a portion of the second conductive layer is exposed from the second alignment layer. The first conductive layer covering the first rough structure has a first rough surface. When rubbing the first alignment layer on the first conductive layer, the first rough surface is exposed from the first alignment layer. When the embedded touch display panel is pressed, the first conductive layer of the first alignment layer electrically contacts the second conductive layer to avoid electrical contact between two conductive layers of the alignment layer being poor. Thus, the operatability of the embedded touch display panel is improved and product quality is enhanced. Moreover, the rough structure can be formed according to the existing manufacturing process of the mask of the touch substrate, which is compatible with the conventional manufacturing process of the touch display panel.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An embedded touch display panel, comprising:
   a first substrate having a displaying region and a sensing region, wherein the first substrate comprises:
      a stack structure disposed on the first substrate within the sensing region, wherein the stack structure comprises a protruding structure and a first rough structure disposed on the protruding structure;
      a first conductive layer disposed on the first substrate within the sensing region and conformally disposed on the stack structure, wherein the first conductive layer has a first rough surface; and
      a first alignment layer covering the first conductive layer, wherein the first rough surface of the first conductive layer is exposed from the first alignment layer;
   a second substrate correspondingly disposed on one side of the first substrate, wherein the second substrate comprises:
      a second conductive layer whose position corresponds to the sensing region, wherein the second conductive layer is disposed on the second substrate; and
      a second alignment layer covering the second conductive layer, wherein a portion of the second conductive layer whose position corresponds to the first rough surface of the first conductive layer is exposed from the second alignment layer; and
   a liquid crystal layer disposed between the first substrate and the second substrate.

2. The embedded touch display panel according to claim 1, wherein the protruding structure comprises a sensing protrusion.

3. The embedded touch display panel according to claim 2, wherein the protruding structure and the first rough structure are made from the same material.

4. The embedded touch display panel according to claim 1, wherein the first rough structure has a plurality of slots such that the first conductive layer has the first rough surface.

5. The embedded touch display panel according to claim 1, wherein the first rough structure has a plurality of protrusions such that the first conductive layer has the first rough surface.

6. The embedded touch display panel according to claim 1, further comprising:
   a spacer disposed between the first substrate and the second substrate such that the first substrate and the second substrate are separated by a distance.

7. The embedded touch display panel according to claim 1, wherein the exposed portion of the second conductive layer has a second rough surface.

8. The embedded touch display panel according to claim 7, wherein the second substrate further comprises:
   a second rough structure disposed on the side of the second conductive layer opposite to the first substrate and corresponding to the second rough surface.

9. A touch substrate applicable to an embedded touch display panel, comprising:
   a base having a displaying region and a sensing region;
   a rough structure disposed on the base within the sensing region;
   a conductive layer conformally disposed on the rough structure and having a rough surface; and
   an alignment layer disposed on the conductive layer, wherein the rough surface of the conductive layer is exposed from the alignment layer that covers the base and the conductive layer.

10. The touch substrate according to claim 9, wherein the rough structure has a plurality of slots such that the conductive layer has the rough surface.

11. The touch substrate according to claim 9, wherein the rough structure has a plurality of protrusions such that the conductive layer has the rough surface.

12. The touch substrate according to claim 9, wherein the rough structure comprises:
   a patterned metal layer disposed between the base and the conductive layer, wherein the patterned metal layer has a first pattern.

13. The touch substrate according to claim 12, wherein the rough structure further comprises:
   a patterned semiconductor layer disposed between the patterned metal layer and the conductive layer, wherein the patterned semiconductor layer has a second pattern.

14. The touch substrate according to claim 9, further comprising:
   a protruding structure disposed between the rough structure and the base.

15. The touch substrate according to claim 14, wherein the protruding structure comprises a sensing protrusion.

16. The touch substrate according to claim 15, wherein the protruding structure and the rough structure are made from the same material.

17. A method of manufacturing touch substrate applicable to an embedded touch display panel, the method comprising:
   providing a base having a displaying region and a sensing region;
   forming a rough structure on the base within the sensing region;
   conformally forming a conductive layer on the rough structure, wherein the conductive layer disposed on the rough structure has a rough surface; and
   forming an alignment layer on the conductive layer by the rubbing process and exposing a portion of the rough surface.

18. The manufacturing method according to claim 17, wherein the step of forming rough structure comprises:
   forming a metal layer on the base; and
   patterning the metal layer within the sensing region to form a patterned metal layer.

19. The manufacturing method according to claim 18, further comprising:
   forming a semiconductor layer on the patterned metal layer; and
   patterning the semiconductor layer within the sensing region to form a patterned semiconductor layer.

20. The manufacturing method according to claim 17, wherein the step of forming the rough structure comprises:
   forming a plurality of slots, wherein the extending direction of the slots is substantially perpendicular to the rubbing direction of the alignment layer.

21. The manufacturing method according to claim 20, wherein the step of forming a plurality of slots comprises:
   performing exposure by a mask having a plurality of slits.

22. The manufacturing method according to claim 20, wherein the step of forming a plurality of slots comprises:
   performing exposure by a mask having at least two different light transmittances.

23. The manufacturing method according to claim 17, wherein the step of forming the rough structure comprises:
   forming a plurality of protrusions, wherein the extending direction of the protrusions is substantially perpendicular to the rubbing direction of the alignment layer.

* * * * *